(12) United States Patent
Rao et al.

(10) Patent No.: US 7,814,023 B1
(45) Date of Patent: Oct. 12, 2010

(54) SECURE DOWNLOAD MANAGER

(75) Inventors: Santhpur N. Rao, Superior, CO (US); Valerie Trapa, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 916 days.

(21) Appl. No.: 11/222,997

(22) Filed: Sep. 8, 2005

(51) Int. Cl.
G06F 21/22 (2006.01)
G06F 21/00 (2006.01)
G06F 12/14 (2006.01)

(52) U.S. Cl. .............................. 705/59; 705/50; 705/51

(58) Field of Classification Search ............. 705/50–51, 705/59
See application file for complete search history.

(56) References Cited

U.S. PATENT DOCUMENTS

| | | | |
|---|---|---|---|
| 4,288,659 A | 9/1981 | Atalla | |
| 4,405,829 A * | 9/1983 | Rivest et al. ................... | 380/30 |
| 4,780,821 A | 10/1988 | Crossley | |
| 4,811,393 A | 3/1989 | Hazard | |
| 4,888,800 A | 12/1989 | Marshall et al. | |
| 4,937,863 A | 6/1990 | Robert et al. | |
| 5,157,663 A | 10/1992 | Major et al. | |
| 5,179,591 A | 1/1993 | Hardy et al. | |
| 5,204,897 A | 4/1993 | Wyman | |
| 5,206,903 A | 4/1993 | Kohler et al. | |
| 5,230,020 A | 7/1993 | Hardy et al. | |
| 5,260,999 A | 11/1993 | Wyman | |
| 5,307,481 A | 4/1994 | Shimazaki et al. | |
| 5,329,570 A | 7/1994 | Glassmacher et al. | |
| 5,341,427 A | 8/1994 | Hardy et al. | |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,646,992 A | 7/1997 | Subler et al. | |
| 5,671,412 A | 9/1997 | Christiano | |
| 5,673,315 A * | 9/1997 | Wolf ........................... | 705/59 |
| 5,699,431 A | 12/1997 | Van Oorschot et al. | |
| 5,708,709 A | 1/1998 | Rose | |
| 5,717,604 A | 2/1998 | Wiggins | |

(Continued)

FOREIGN PATENT DOCUMENTS

EP 1071253 1/2001

(Continued)

OTHER PUBLICATIONS

Sun Microsystems, Inc. Java Cryptography Architecture API Specification & Reference, Aug. 4, 2002, pp. 34 and 44.*

(Continued)

*Primary Examiner*—Calvin L Hewitt, II
*Assistant Examiner*—James D Nigh
(74) *Attorney, Agent, or Firm*—Sheridan Ross P.C.

(57) ABSTRACT

A software licensing method and system are in which a set of transient state information 154 for the target computational device at a selected point in time is used to generate a license key 144 to validate that the use of the licensed application is in accordance with the terms and conditions of a license.

21 Claims, 3 Drawing Sheets

U.S. PATENT DOCUMENTS

| | | | |
|---|---|---|---|
| 5,724,428 A * | 3/1998 | Rivest | 380/37 |
| 5,742,757 A | 4/1998 | Hamadani et al. | |
| 5,745,569 A * | 4/1998 | Moskowitz et al. | 705/58 |
| 5,745,576 A | 4/1998 | Abraham et al. | |
| 5,745,879 A | 4/1998 | Wyman | |
| 5,754,761 A | 5/1998 | Willsey | |
| 5,758,068 A | 5/1998 | Brandt et al. | |
| 5,758,069 A | 5/1998 | Olsen | |
| 5,790,074 A | 8/1998 | Rangedahl et al. | |
| 5,790,664 A | 8/1998 | Coley et al. | |
| 5,828,747 A | 10/1998 | Fisher et al. | |
| 5,835,600 A * | 11/1998 | Rivest | 380/44 |
| 5,864,620 A | 1/1999 | Pettitt | |
| 5,905,793 A | 5/1999 | Flockhart et al. | |
| 5,905,860 A | 5/1999 | Olsen et al. | |
| 5,935,243 A | 8/1999 | Hasebe et al. | |
| 5,940,504 A | 8/1999 | Griswold | |
| 5,960,085 A | 9/1999 | de la Huerga | |
| 5,978,565 A | 11/1999 | Ohran et al. | |
| 5,982,873 A | 11/1999 | Flockhart et al. | |
| 5,995,625 A | 11/1999 | Sudia et al. | |
| 6,009,401 A | 12/1999 | Horstmann | |
| 6,011,973 A | 1/2000 | Valentine et al. | |
| 6,023,763 A | 2/2000 | Grumstrup et al. | |
| 6,023,766 A | 2/2000 | Yamamura | |
| 6,047,242 A | 4/2000 | Benson | |
| 6,067,621 A | 5/2000 | Yu et al. | |
| 6,108,703 A | 8/2000 | Leighton et al. | |
| 6,128,389 A | 10/2000 | Chan et al. | |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,178,511 B1 * | 1/2001 | Cohen et al. | 726/6 |
| 6,189,146 B1 | 2/2001 | Misra et al. | |
| 6,192,122 B1 | 2/2001 | Flockhart et al. | |
| 6,212,635 B1 | 4/2001 | Reardon | |
| 6,219,652 B1 | 4/2001 | Carter et al. | |
| 6,223,291 B1 | 4/2001 | Puhl et al. | |
| 6,246,871 B1 | 6/2001 | Ala-Laurila | |
| 6,314,565 B1 | 11/2001 | Kenner et al. | |
| 6,360,320 B1 | 3/2002 | Ishiguro et al. | |
| 6,381,747 B1 | 4/2002 | Wonfor et al. | |
| 6,463,534 B1 | 10/2002 | Geiger et al. | |
| 6,498,791 B2 | 12/2002 | Pickett | |
| 6,502,079 B1 | 12/2002 | Ball et al. | |
| 6,513,117 B2 | 1/2003 | Tarpenning et al. | |
| 6,513,121 B1 | 1/2003 | Serkowski et al. | |
| 6,557,105 B1 | 4/2003 | Tardo et al. | |
| 6,574,612 B1 | 6/2003 | Baratti et al. | |
| 6,584,454 B1 | 6/2003 | Hummel et al. | |
| 6,640,305 B2 | 10/2003 | Kocher et al. | |
| 6,654,888 B1 * | 11/2003 | Cooper et al. | 713/190 |
| 6,675,208 B1 | 1/2004 | Rai et al. | |
| 6,697,945 B2 | 2/2004 | Ishiguro et al. | |
| 6,760,324 B1 | 7/2004 | Scott et al. | |
| 6,765,492 B2 | 7/2004 | Harris | |
| 6,769,063 B1 * | 7/2004 | Kanda et al. | 713/193 |
| 6,775,782 B1 | 8/2004 | Buros et al. | |
| 6,778,820 B2 | 8/2004 | Tendler | |
| 6,816,842 B1 | 11/2004 | Singh et al. | |
| 6,826,606 B2 | 11/2004 | Freeman et al. | |
| 6,850,958 B2 | 2/2005 | Wakabayashi | |
| 6,854,010 B1 | 2/2005 | Christian et al. | |
| 6,868,403 B1 | 3/2005 | Wiser et al. | |
| 6,876,984 B2 | 4/2005 | Tadayon et al. | |
| 6,883,095 B2 | 4/2005 | Sandhu et al. | |
| 6,889,212 B1 | 5/2005 | Wang et al. | |
| 6,901,386 B1 | 5/2005 | Dedrick et al. | |
| 6,904,523 B2 | 6/2005 | Bialick et al. | |
| 6,920,567 B1 | 7/2005 | Doherty et al. | |
| 6,928,166 B2 | 8/2005 | Yoshizawa | |
| 6,928,558 B1 | 8/2005 | Allahwerdi et al. | |
| 6,934,463 B2 | 8/2005 | Ishiguro et al. | |
| 6,934,848 B1 | 8/2005 | King et al. | |
| 6,957,344 B1 | 10/2005 | Goldshlag et al. | |
| 6,961,858 B2 | 11/2005 | Fransdonk | |
| 6,968,384 B1 | 11/2005 | Redding et al. | |
| 6,973,444 B1 | 12/2005 | Blinn et al. | |
| 6,976,164 B1 | 12/2005 | King et al. | |
| 6,981,222 B2 | 12/2005 | Rush et al. | |
| 6,993,664 B2 | 1/2006 | Padole et al. | |
| 7,032,113 B2 | 4/2006 | Pendlebury | |
| 7,035,918 B1 | 4/2006 | Redding et al. | |
| 7,065,214 B2 | 6/2006 | Ishiguro et al. | |
| 7,073,063 B2 | 7/2006 | Peinado | |
| 7,080,402 B2 | 7/2006 | Bates et al. | |
| 7,085,382 B2 | 8/2006 | Terao et al. | |
| 7,100,044 B2 | 8/2006 | Watanabe et al. | |
| 7,100,200 B2 | 8/2006 | Pope et al. | |
| 7,124,304 B2 | 10/2006 | Bel et al. | |
| 7,139,737 B2 | 11/2006 | Takahashi et al. | |
| 7,143,409 B2 | 11/2006 | Herrero | |
| 7,146,340 B1 | 12/2006 | Musson | |
| 7,149,806 B2 | 12/2006 | Perkins et al. | |
| 7,152,245 B2 | 12/2006 | Dublish et al. | |
| 7,171,662 B1 | 1/2007 | Misra et al. | |
| 7,185,195 B2 | 2/2007 | Hug et al. | |
| 7,206,936 B2 | 4/2007 | Aull et al. | |
| 7,225,333 B2 | 5/2007 | Peinado et al. | |
| 7,228,426 B2 * | 6/2007 | Sinha et al. | 713/176 |
| 7,228,567 B2 * | 6/2007 | Serkowski et al. | 726/30 |
| 7,272,500 B1 * | 9/2007 | Walker | 701/213 |
| 7,302,703 B2 | 11/2007 | Burns | |
| 7,313,828 B2 | 12/2007 | Holopainen | |
| 7,318,236 B2 | 1/2008 | DeMello et al. | |
| 7,336,791 B2 | 2/2008 | Ishiguro | |
| 7,356,692 B2 | 4/2008 | Bialick et al. | |
| 7,382,881 B2 * | 6/2008 | Uusitalo et al. | 380/262 |
| 7,383,205 B1 | 6/2008 | Peinado et al. | |
| 7,415,729 B2 | 8/2008 | Ukeda et al. | |
| 7,552,166 B2 | 6/2009 | Chack | |
| 2001/0001268 A1 | 5/2001 | Menon et al. | |
| 2001/0034846 A1 * | 10/2001 | Beery | 713/201 |
| 2002/0013722 A1 | 1/2002 | Kanaga | |
| 2002/0017977 A1 | 2/2002 | Wall | |
| 2002/0038422 A1 | 3/2002 | Suwamoto et al. | |
| 2002/0052939 A1 | 5/2002 | Lee | |
| 2002/0083003 A1 | 6/2002 | Halliday et al. | |
| 2002/0087892 A1 | 7/2002 | Imazu | |
| 2002/0104006 A1 | 8/2002 | Boate et al. | |
| 2002/0107809 A1 | 8/2002 | Biddle et al. | |
| 2002/0112186 A1 | 8/2002 | Ford et al. | |
| 2002/0116340 A1 | 8/2002 | Hellberg et al. | |
| 2002/0138441 A1 | 9/2002 | Lopatic | |
| 2002/0154777 A1 | 10/2002 | Candelore | |
| 2002/0161996 A1 * | 10/2002 | Koved et al. | 713/150 |
| 2002/0164025 A1 | 11/2002 | Raiz et al. | |
| 2002/0169625 A1 | 11/2002 | Yang et al. | |
| 2002/0176404 A1 | 11/2002 | Girard | |
| 2002/0188656 A1 | 12/2002 | Patton et al. | |
| 2002/0188704 A1 | 12/2002 | Gold | |
| 2003/0013411 A1 | 1/2003 | Uchiyama | |
| 2003/0018491 A1 | 1/2003 | Nakahara et al. | |
| 2003/0018582 A1 | 1/2003 | Yaacovi | |
| 2003/0023564 A1 | 1/2003 | Padhye et al. | |
| 2003/0055749 A1 | 3/2003 | Carmody et al. | |
| 2003/0095542 A1 | 5/2003 | Chang et al. | |
| 2003/0144959 A1 | 7/2003 | Makita | |
| 2003/0149670 A1 | 8/2003 | Cronce | |
| 2003/0149874 A1 | 8/2003 | Balfanz et al. | |
| 2003/0156719 A1 | 8/2003 | Cronce | |
| 2003/0159033 A1 | 8/2003 | Ishiguro | |
| 2003/0163428 A1 * | 8/2003 | Schneck et al. | 705/51 |

| | | | |
|---|---|---|---|
| 2003/0177393 | A1 | 9/2003 | Ishiguro |
| 2003/0191936 | A1 | 10/2003 | Kawatsura et al. |
| 2003/0191940 | A1* | 10/2003 | Sinha et al. ................ 713/176 |
| 2003/0194085 | A1* | 10/2003 | Dillaway ..................... 380/29 |
| 2003/0208449 | A1 | 11/2003 | Diao |
| 2003/0233547 | A1* | 12/2003 | Gaston et al. ............... 713/168 |
| 2004/0044629 | A1 | 3/2004 | Rhodes et al. |
| 2004/0044630 | A1 | 3/2004 | Walker et al. |
| 2004/0044631 | A1 | 3/2004 | Walker et al. |
| 2004/0044901 | A1 | 3/2004 | Serkowski et al. |
| 2004/0054909 | A1 | 3/2004 | Serkowski et al. |
| 2004/0054930 | A1 | 3/2004 | Walker et al. |
| 2004/0073517 | A1 | 4/2004 | Zunke et al. |
| 2004/0088541 | A1 | 5/2004 | Messerges et al. |
| 2004/0103011 | A1 | 5/2004 | Hatano et al. |
| 2004/0103324 | A1 | 5/2004 | Band |
| 2004/0127196 | A1 | 7/2004 | Dabbish et al. |
| 2004/0128395 | A1 | 7/2004 | Miyazaki |
| 2004/0133794 | A1* | 7/2004 | Kocher et al. ............... 713/193 |
| 2004/0162998 | A1 | 8/2004 | Tuomi et al. |
| 2004/0166878 | A1 | 8/2004 | Erskine et al. |
| 2004/0249763 | A1 | 12/2004 | Vardi |
| 2004/0260589 | A1 | 12/2004 | Varadarajan et al. |
| 2004/0268120 | A1 | 12/2004 | Mirtal et al. |
| 2005/0005098 | A1 | 1/2005 | Michaelis et al. |
| 2005/0038753 | A1 | 2/2005 | Yen et al. |
| 2005/0076204 | A1 | 4/2005 | Thornton et al. |
| 2005/0086174 | A1 | 4/2005 | Eng |
| 2005/0091507 | A1 | 4/2005 | Lee et al. |
| 2005/0144437 | A1 | 6/2005 | Ransom et al. |
| 2005/0154877 | A1 | 7/2005 | Trench |
| 2005/0185792 | A1 | 8/2005 | Tokutani et al. |
| 2005/0198510 | A1 | 9/2005 | Robert et al. |
| 2005/0202830 | A1 | 9/2005 | Sudit |
| 2005/0229004 | A1 | 10/2005 | Callaghan |
| 2005/0246098 | A1 | 11/2005 | Bergstrom et al. |
| 2005/0289072 | A1* | 12/2005 | Sabharwal ................... 705/59 |
| 2006/0021068 | A1 | 1/2006 | Xu et al. |
| 2006/0026105 | A1 | 2/2006 | Endoh |
| 2006/0036554 | A1 | 2/2006 | Schrock et al. |
| 2006/0036894 | A1 | 2/2006 | Bauer et al. |
| 2006/0064582 | A1 | 3/2006 | Teal et al. |
| 2006/0089912 | A1 | 4/2006 | Spagna et al. |
| 2006/0178953 | A1 | 8/2006 | Aggarwal et al. |
| 2006/0242083 | A1 | 10/2006 | Chavez |
| 2006/0294010 | A1 | 12/2006 | Kim et al. |
| 2007/0033419 | A1* | 2/2007 | Kocher et al. ............... 713/193 |
| 2007/0107067 | A1 | 5/2007 | Fountian |
| 2007/0219917 | A1 | 9/2007 | Liu et al. |
| 2008/0052295 | A1 | 2/2008 | Walker et al. |
| 2008/0082449 | A1 | 4/2008 | Wilkinson et al. |
| 2008/0141242 | A1* | 6/2008 | Shapiro ...................... 717/174 |

FOREIGN PATENT DOCUMENTS

| | | | |
|---|---|---|---|
| EP | 1562378 | A1 * | 8/2005 |
| JP | 2006/085481 | | 3/2006 |

OTHER PUBLICATIONS cr8523_01[1].pdf, Handbook of Applied Cryptography, A. Menezes, P. van Oorschot and S. Vanstone, Section 1.4 Basic Terminology and Concepts.* cr8523_10[1].pdf, Handbook of Applied Cryptography, A. Menezes, P. van Oorschot and S. Vanstone, Section 10.3.1 Background on time-variant parameters.* cr8523_12[1].pdf, Handbook of Applied Cryptography, A. Menezes, P. van Oorschot and S. Vanstone, Section 12.2.2, Objectives and Properties, 1997 CRC Press LLC.*

Multos Fights On, Jan. 2004, Thomson Media, Inc., Jan. 2004, pp. 1-7.*

Kuchinskas, Susan, Keeping content safe is a big job and everyone has to do it: the security of its corporate content can make or break Topps. (Topps employs security consultant to watch network traffic), Jul. 2003, 2003 Online, Inc., Jul. 2003, pp. 1-5.*

Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.*

Background of the Invention for the above-captioned patent application (previously provided).

U.S. Appl. No. 10/231,957, Serkowski et al.
U.S. Appl. No. 10/231,999, Walker et al.
U.S. Appl. No. 10/232,507, Rhodes et al.
U.S. Appl. No. 10/232,508, Walker et al.
U.S. Appl. No. 10/232,906, Walker et al.
U.S. Appl. No. 10/232,647, Walker et al.
U.S. Appl. No. 10/278,504, Goringe et al.
U.S. Appl. No. 10/348,107, Walker et al.
U.S. Appl. No. 10/377,369, Chavez.
U.S. Appl. No. 10/385,817, Walker.
U.S. Appl. No. 10/387,182, Walker.
U.S. Appl. No. 10/405,176, Mazza et al.
U.S. Appl. No. 10/811,412, Walker.

ADTech Engineering, IP Phone SI-160 User Manual (SCCP releases) Version 1.2 (2002). pp. 1-20.

"The Cricket Indoor Location System: An NMS Project @ MIT LCS" at http://nms.lcs.mit.edu/projects/cricket (Jul 31, 2002), pp. 1-5.

Roger Clarke, "Centrelink Smart Card Technical Issues Starter Kit Chapter 7" (Apr. 8, 1998) at http://www.anu.edu.au/people/Roger.Clarke/DV/SCTISK.html, pp. 1-3.

Datakey, "Securing a Virtual Private Network with Smart Card Technology" available at www.datakey.com pp. 1-8.

"Smart Card Authentication" at http://msdn.microsoft.com/library/en-us/security/security/smart_card_authenication.asp (Aug. 2002). pp. 1-2.

"Smart Card Interfaces" at http://msdn.microsoft.com/library/en-us/security/security/smart_card_interfaces.asp (Aug. 2002), p. 1.

"Primary Service Provider" at http://msdn.microsoft.com/library/en-us/security/security/primary_service_provider.asp (Aug. 2002), p. 1.

"Introducing Smart Cards to the System" at http://msdn.microsoft.com/library/en-us/security/security/introducing_smart_cards_to_the_system.asp (Aug. 2002), p. 1.

"Accessing a Smart Card" at http://msdn.microsoft.com/library/en-us/security/security/accessing_a_smart_card.asp (Aug. 2002), p. 1.

"Smart Card Resource Manager" at http://msdn.microsoft.com/library/en-us/security/security/smart_card_resource_manager.asp (Aug. 2002), p. 1.

"Smart Card User Interface" at http://msdn.microsoft.com/library/en-us/security/security/smart_card_user_interface.asp (Aug. 2002), p. 1.

"Smart Card Service Providers" at http://msdn.microsoft.com/library/en-us/security/security/smart_card_service_providers.asp (Aug. 2002), p. 1.

"Base Service Providers" at http://msdn.microsoft.com/library/en-us/security/security/base_service_providers.asp (Aug. 2002), p. 1.

"Building an ISO7816-4 APDU Command" at http://msdn.microsoft.com/library/en-us/security/security/building_an_iso7816_4_apdu_command.asp (Aug. 2002), pp. 1-2.

"Vendor Wrapper Service Provider" at http://msdn.microsoft.com/library/en-us/security/security/vendor_wrapper_service_provider.asp (Aug. 2002), pp. 1-2.

"Global Control of All Buying and Selling Now Possible," *Discerning the Times Diciest and Newsbytes*, vol. 1, Iss. ! (Jan. 2000), available at http://www.discerningtoday.org/members/Digest/2000Digest/January/Global%20Control.htm, 2 pages.

NEC Infrontia Corporation Press Release "Establishment of "SmartCardInfrontia" solutions for IC card," (Mar. 13, 2002), 4 pages.

Smart Card Alliance, "Industry News: Cubic Introduces New Mobile Ticketing Machine" (Jul. 3, 2003), available at http://www.smartcardalliance.org/industry_news/industry_news_item.cfm?itemID=852, 2 pages.

Smart Card Alliance, "Industry News: Cubic Corp. Introduces New National Security and Homeland Defense" (Sept. 9, 2002), available at http://www.smartcardalliance.org/industry_news/industry_news_item.cfm?itemID=310, 2 pages.

Motorola Press Release, "ERG Motorola Alliance Receives Award for Smart Card" (Jun. 6, 2000), available at http://www.motorola.com/LMPS/pressreleases/page888.htm, 3 pages.

Microsoft Software Piracy Protection "Product Activation Facts", at http://www.microsoft.com/piracy/activation_faq.mspx, Copyright 2005, 10 pages.

SIP.edu Cookbook, "SIP.edu and Avaya Converged Community Server", at http://mit.edu/sip/sip.edu/avaya.shtml, (Nov. 2004, Mar. 2005) 19 pages.

Avaya—"Product Support Notices (All Avaya Products): Product Support Notices", at http://support.avaya.com/japple/css/japple?temp.documentID=233413&temp.productID=1....undated, 2 pages.

Avaya—"Voice over IP Monitoring" at http://www.avaya.com/gcm/master-usa/en-us/products/offers/integrated_mgt_voip_monoto.....copyright 2005, 2 pages.

U.S. Appl. No. 10/775498, Gilman.

U.S. Appl. No. 10/947418, Gilman.

U.S. Appl. No. 10/956861, Robinson.

U.S. Appl. No. 11/051316, Mazza.

Arsys, "Public Key Infrastructure," (Feb. 4, 2001), available at http://www.transactiontrust.com/technicaindex.html, 4 pages.

Articsoft Limited, "Public Key Infrastructure (PKI) FAQs" (Feb. 2, 2003), available at http://www.articsoft.com/wp_pki_faq.htm, 5 pages.

"Digital Cinema Key Management Messages," Draft 1 (Aug. 8, 2002), pp. 1-9.

Entrust Inc., "Entrust Authority Security Manager,", avaiable at http://www.entrust.com/authority/manager/index.htm, 23 pages; 2004.

Giswold, Robert S., "Get Smart: The Coming Revolution of Smart Cards," Journal of Property Management (May/Jun. 1997), 5 pages.

Info Merchant Store, "VeriFone 2000, MS/DUKPT/STD Pin Pad, New" (printed Feb. 17, 2004), avaiable at http://www.merchantamerica.com/creditcardterminals/index.php?ba=product_enlarge&product=9632, 1 page.

Infosec Engineering, "Building a Corporate Public Key Infrastructure" (1999), available at http://www.infoseceng.com/corppki.htm, 20 pages.

LockStream Corporation, "Catalyst DRM Service Platform"; available at http://www.lockstream.com/products_spcm.php, 1 page; 2003.

LockStream Corporation, "Lockstream KeyDRM"; available at http://www.lockstream.com/products_1gm.php, 2 pages; 2003.

LockStream Corporation, "Lockstream OMA 1.0 DRM Client", available at http://www.lockstream.com/products_sprm.php, 2 pages; 2003.

LockStream Corporation, Catalyst DRM Service Platform Architecture, Vers. 1.0 (Nov. 2003), pp. 1-28.

NetLingo Dictionary of Internet Words, "Smart Card" (1995-2004), available at http://www.netlingo.com/lookup.cfm?term=smart+card, 2 pages.

Novell®, "Certificate Server: Public Key Infrastructure," White Paper (1999), pp. 1-10.

Rankl, Wolfgang, "Smart Card Handbook,", available at http://www.wrankl.de/SCH/SCH.html, 8 pages; 1998-2004.

Russinovich, Mark, "Inside Encrypting Fily System, Part 1, "Windows & .NET Magazine (Jun. 1999), available at http://www.winntmag.com/Articles/Index.cfm?ArticleID=5387 &Key=Internals, 4 pages.

Russinovich, Mark, "Inside Encrypting Fily System, Part 2, "Windows & .NET Magazine (Jul. 1999), available at http://www.winntmag.com/Articles/Index.cfm?ArticleID=5592 &Key=Internals, 5 pages.

Security Config, Back Up Your Encrypting File System Private Key in Windows 2000 Download; avaiable at http://www.securityconfig.com/software/alerts/back_up_your_encrypting_file_system_private_key_in_windows_2000.html, 2 pages; 2003.

Smart Card Alliance Industry News, "Cubic Introduces New Mobile Ticketing Machine" (Jul. 3, 2003), avaiable at http://www.smartcardalliance.org/industry_news/industry_news_item.cfm?itemID=852, 2 pages.

SSH Communications Security Corp., "Enabling Virtual Public Networks with Public Key Infrastructure," White Paper (Jan. 2004), pp. 1-9.

Streetman, Kibbee K. et al., "Public Key Infrastructure: Resources, Requirements and Recommendations," ATI IPT Special Report 00-06 (Apr. 20000), p. 145.

Sun Developer Network, "Smart Card Overview," Sun Microsystems, Inc. (1994-2004), avaiable at http://java.sun.com/products/javacard/smartcards.html, 2 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target SearchTM, "PKI" (Jan. 13, 2004), available at http://whatis.techtarget.com/definition/0,2989893,sid9_gci214299,00.html, 4 pages.

Matlab Installation Guide for PC, Release 11, The MathWorks Inc, 1999.

Microsoft Systems Management Server 2.0 Resource Guide, Microsoft Press, 1999. ISBN 0-7356-0583-1.

Windows NT Server 4. Garms, Jason. SAMS Publishing, 1998. ISBN 0-672-31249-2.

Java Skyline: Java Servlet/Server Headline News, Oct. through Dec. 1998, pp. 1-3.

FLEXlm End Users Guide, Version 9.2. Jul. 2003. Published by Macrovision. 166 pages.

* cited by examiner

SECURE DOWNLOAD MANAGER

CROSS REFERENCE TO RELATED APPLICATION

Cross reference is made to U.S. patent application Ser. Nos. 10/232,906, filed Aug. 30, 2002, entitled "REMOTE FEATURE ACTIVATOR FEATURE EXTRACTION" to Walker et al.; 10/231,999, filed Aug. 30, 2002, and entitled "FLEXIBLE LICENSE FILE FEATURE CONTROLS" to Walker et al.; 10/232,507, filed Aug. 30, 2002, and entitled "LICENSE FILE SERIAL NUMBER TRACKING" to Serkowski et al.; 10/231,957, filed Aug. 30, 2002, and entitled "LICENSING DUPLICATED SYSTEMS" to Serkowski et al.; and 10/232,647, filed Aug. 30, 2002, and entitled "SOFTWARE LICENSING FOR SPARE PROCESSORS" to Walker et al.; 10/232,508, filed Aug. 30, 2002, and entitled "LICENSE MODES IN CALL PROCESSING", to Rhodes et al.; 10/348,107, filed Jan. 20, 2003, and entitled "REMOTE FEATURE ACTIVATION AUTHENTICATION FILE SYSTEM"; and 10/387,182, filed Mar. 11, 2003, to Walker et al., each of which is incorporated herein by reference.

FIELD OF THE INVENTION

The invention relates generally to media licensing and particularly to software licensing.

BACKGROUND OF THE INVENTION

Software piracy is an enormous drain on the global economy according to the Software Piracy Report. The report estimates worldwide losses in 2000 due to software piracy of at least $12 billion. Software piracy also has a significant impact on the high-tech industry, resulting in lost jobs, decreased innovation, and higher costs to consumers.

To combat software piracy, various licensing verification/activation have been developed. Such products commonly require software to be activated during or after installation on a target device. Product activation works by validating that the software's installation key, required as part of installation, has not been used in excess of licensing restrictions. In one product, the installation key is a function of three components. One component is a product ID generated from static hardware information, such as Display Adapter, SCSI Adapter, IDE Adapter, Network Adapter, MAC address, RAM amount range (i.e., 0-64 mb, 64-128 mb, etc.), processor-type, processor serial number, hard drive device, and hard drive volume serial number. The second component is a hardware hash generated from the device's hardware configuration. The third component is a product key. A hash algorithm is used to determine the hardware ID. The hardware hash is a non-unique number generated from one or more static identifiers during activation. The product key is sent along with the hardware hash to an activation server maintained by a vendor. Activation is completed either directly via the Internet or by a telephone call to customer service representative. Application products go into reduced functionality mode if the user does not activate before the end of the grace period. Activation discourages piracy by limiting the number of times a product key can be activated on different devices.

The use of static identifiers is subject to piracy by "spoofing". For example, if the static identifier is a MAC address a software pirate can change the MAC address of his device programmatically or through hardware settings. Thus, the pirate can reuse the software on different devices altered to have the same MAC address.

SUMMARY OF THE INVENTION

These and other needs are addressed by the various embodiments and configurations of the present invention. The present invention is directed to a software licensing method using dynamic state information and/or a piracy guard to combat unlawful use of the software.

In one embodiment of the present invention, a software licensing method is provided that includes the steps:

(a) loading a licensed application onto a target computational device;

(b) determining, at a selected point in time, a set of transient state information for the target computational device;

(c) generating a license key based on the transient state information and/or a derivative thereof; and (d) using the license key to validate the use of the licensed application.

The transient state information generally describes a state of the target computational component at the selected point in time. In one configuration, the transient state information is one or more of a clock setting at a specified event, an available memory in the target device at a selected time, an unavailable memory in the target device at a selected time, a number of processes running in the target device at a selected time, available disk space, file system characteristics, e.g. number of text files, opened files, hidden files, etc., and process ids.

The use of transient state information to determine a license key can provide a number of advantages. For example, the key is not determined entirely based on a static identifier. Transient state information is temporally changing and is difficult, if not impossible, to spoof. The methodology of the present invention can further be independent of the operating system of the target device and designed not to persist any information on the installation platform. Thus, a user cannot obtain the information and use it for spoofing. In one configuration, the transient state information is determined when a client (which directs the installation process on the target device) is invoked by a user. If the user makes additional copies of the client, each invocation will have unique transient information that is used to form a secondary key. The license or installation key is generated from the secondary key (i.e., a derivative of the transient state information). The license key will be valid only for the client invocation that requested it. The validation of step (d) would fail for the unauthorized duplicated clients and would prevent use of the licensed application. The secondary key, being unique for each installation attempt, allows the number of installation attempts to be tracked accurately.

In a second embodiment, a software licensing method is provided that includes the steps:

(a) loading an application onto a target computational device, the licensed application including a piracy guard operable to disable the application;

(b) determining whether use of the application is permitted under a software license; and (c) when use of the application is permitted under the license, removing the piracy guard to enable the application.

The piracy guard can be one or more of (i) a byte code inserted into the licensed application code; (ii) a byte code removed from the licensed application code; and (iii) an altered byte code in the licensed application code. In one configuration, the guard is a mask that inserts, removes, or alters code at a number of discrete locations in the application.

In-memory license activation of the prior embodiment and the piracy guard can prevent users from extracting the payload and attempting to install directly. Only the deactivated license could be extracted. Direct invocation of the deactivated license fails.

Licensing validation using transient state information and a piracy guard can be used to provide a one-time license allowing an application to execute only once or a fixed number of times. The conventional use of a hardware identification number does not provide this capability. The approach can be used by software vendors offering software as a service and desiring to sell single uses of an application.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
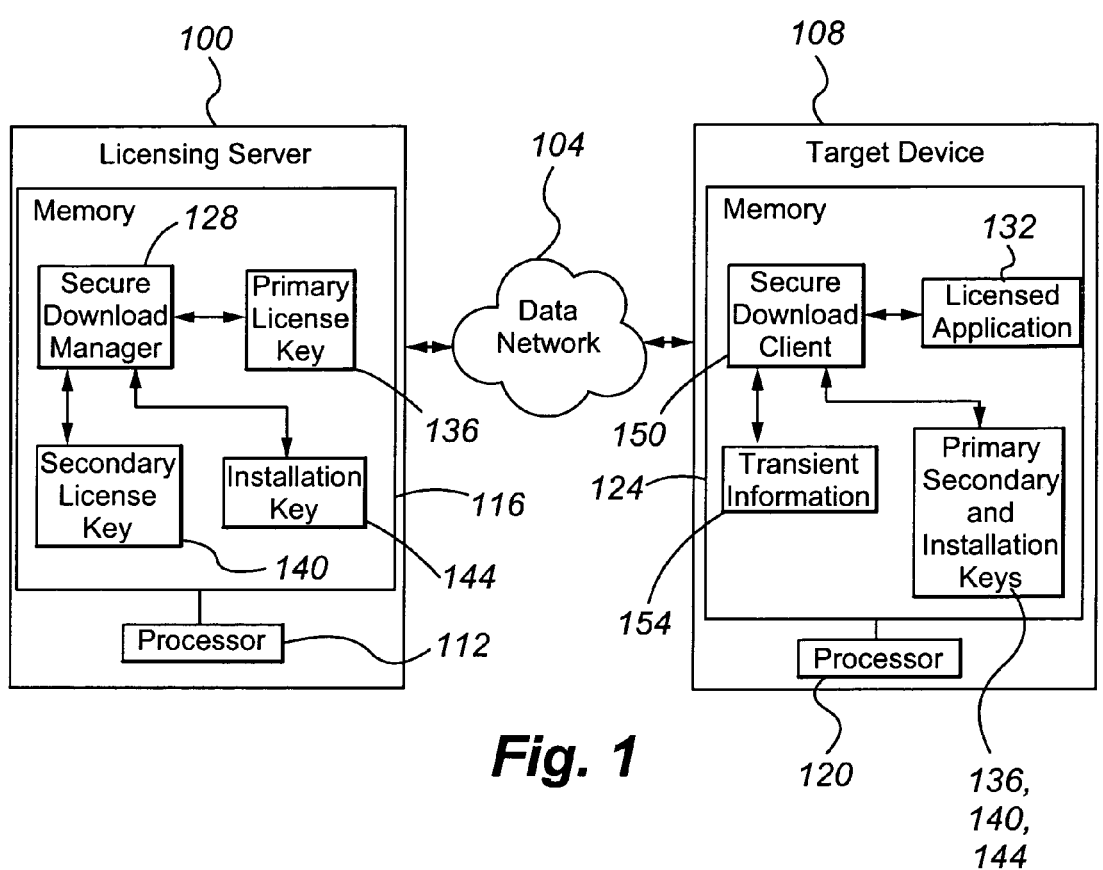
FIG. 1 is a block diagram of a licensing architecture according to an embodiment of the present invention.

FIG. 1 depicts a licensing architecture according to an embodiment of the present invention. The architecture includes a licensing server 100 in communication, via data network 104, with a target device 108.

The licensing server 100 may be part of the same enterprise as or a different enterprise network from the enterprise network containing the target device 108. The licensing server 100, in one configuration, is in the enterprise network of a manufacturer or vendor of the application software to be licensed or a servicing entity affiliated with the manufacturer or vendor. The licensing server 100 is preferably a software controlled device comprising a processor 112, such as a microprocessor and other types of digital logic circuits, and a memory 116. Memory 116 is volatile and/or nonvolatile and can include Random Access Memory or RAM and mass storage, such as a hard disk, floppy disk, CD ROM, DVD, and tape.

The target device 108 also includes a processor 120 and memory 124. As in the case of the licensing server 100, the processor 120 is preferably a microprocessor but the memory 124 is preferably volatile memory. As will be appreciated, the device 108 may include additional nonvolatile memory, depending on the application. The target device is either itself being licensed and/or contains application software to be licensed. For example, in a telecommunications application the target device 108 can be a switch, media server, gateway, messaging server, telephone (packet-switched or circuit-switched), Personal Computer (or PC), laptop, Call Management Systems (CMS), Interactive Voice Response systems (IVR), and handheld devices.

The data network 104 can be a trusted (secure) or untrusted (insecure) network. Examples of a trusted network would be a Local Area Network or LAN and a Virtual Private Network. Examples of an untrusted network would be a Wide Area Network, such as the Internet. As will be appreciated, the data network 104 may be replaced by a circuit-switched network, such as the Public Switched Telephone Network or PSTN.

The memories 116 and 124 of the licensing server 100 and target device 108 include a number of entities used in the licensing methodology of the present invention. The memory 116 of the licensing server 100 includes a secure download manager 128 (which performs the authentication and authorization processes and controls activation of the licensed application 132), a primary license key 136 (which may be unique for each installation attempt or reused across multiple attempts), a secondary license key 140 (which is unique for each installation attempt), and an installation key 144 (which is generated from the primary and secondary license keys 136 and 140). The memory of the target device 108 includes a secure download client 150 (which communicates with the secure download manager 128 and activates and deactivates the licensed application 132 in response to commands from the secure download manager 128), the licensed application 132 itself (which can be any licensed application and/or process such as a software patch, software upgrade, and software product, transient state information 154 (which temporally changes and is used to generate the secondary license key 140), and the primary, secondary, and installation license keys 136, 140, and 144. As will be appreciated, FIG. 1 shows the contents of the memories near or at the completion of the activation process. The various keys are generated and exchanged at different points in the activation process as discussed below.

The activation process differs from the activation processes of the prior art in a number of respects. For example, the secondary license key 140 is not generated from a static identifier alone. It is generated using the transient state information 154 either alone or in addition to one or more static identifiers. A separated and unique secondary license key is generated from different transient state information for each installation attempt. In a preferred configuration, the client 150 directs the execution of the licensed application and activates and deactivates the application each time the licensed application is to be executed. In other words, the secure download client 150 performs the activation process whenever the application 132 is to be executed and, after execution, deactivates the application 132 so that it is inoperable.

Figure 2:
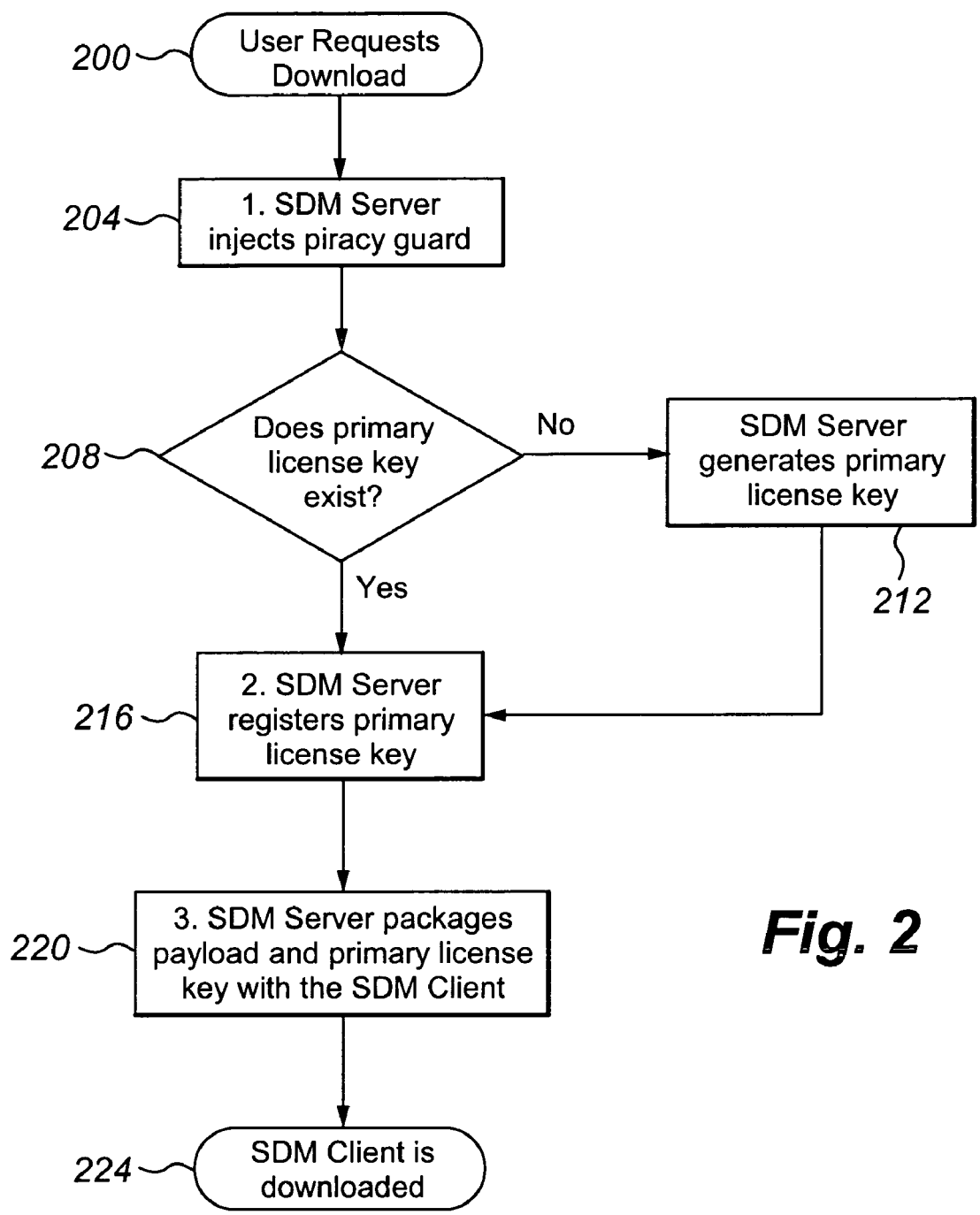
FIG. 2 is a flow chart of a licensing authentication and validation methodology according to an embodiment of the present invention.
Figure 3:
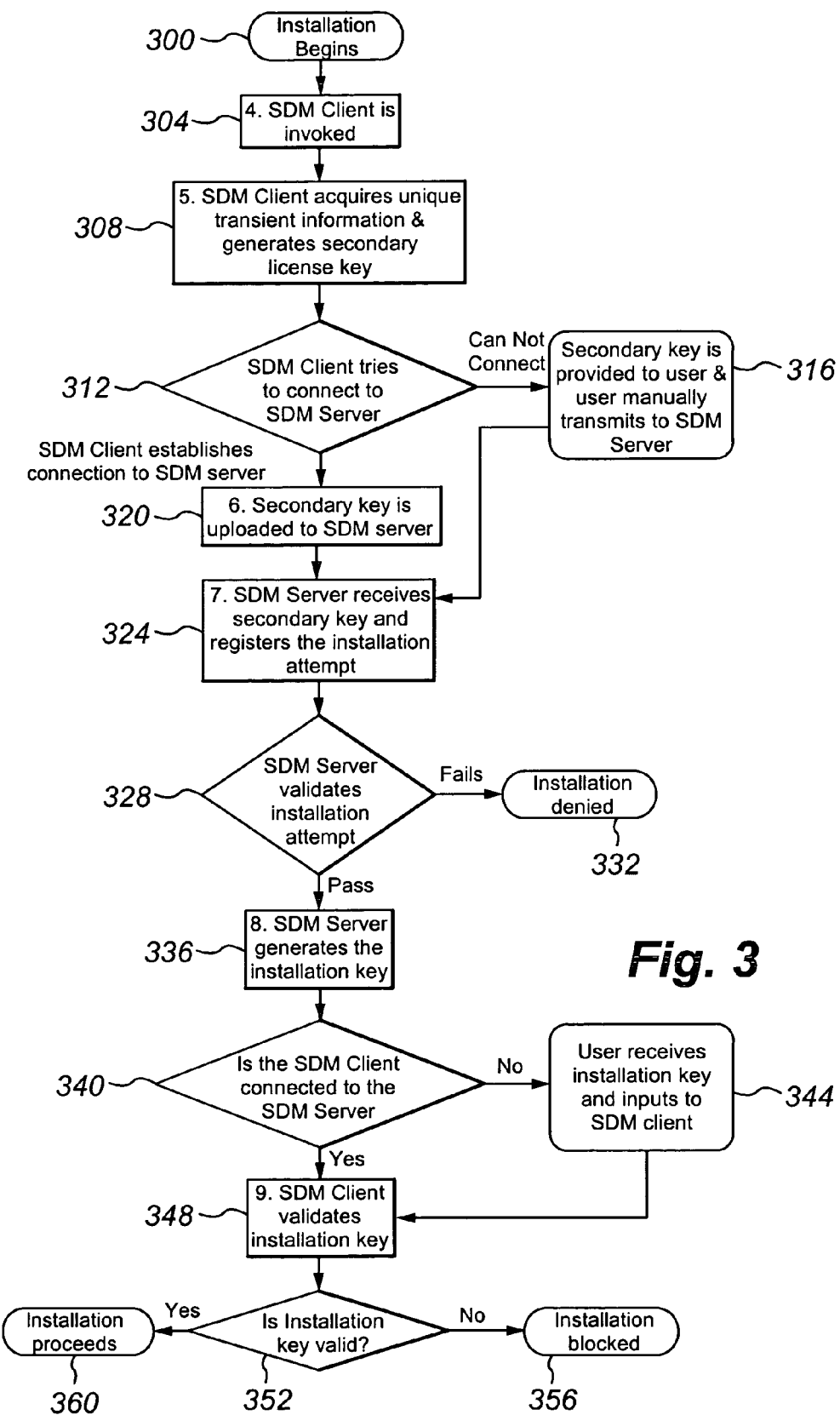
FIG. 3 is a flow chart of a licensing authentication and validation methodology according to an embodiment of the present invention.

The operation of the secure download manager 128 and secure download client 150 will now be discussed with reference to FIGS. 2-3. FIG. 2 depicts the preparation of the secure download client 150, and FIG. 3 depicts the activation process for the licensed application 132.

Referring to FIG. 2, the user of the target device 108 requests a download of the licensed application 132 in step 200. The request is forwarded to the licensing server 100 via the data network 104.

In response, the secure download manager 128, in step 204, installs a piracy guard in the licensed application 132. As will be appreciated, this step can be performed before the download request is received. The piracy guard is any mechanism that prevents or obstructs full operation of the licensed application. For example, the piracy guard can lock and prevent execution of one or more features of the licensed application or of execution of the licensed application in its entirety. The latter alternative is preferred. In one configuration, the piracy guard is a segment of byte code that is inserted into or removed from the licensed application, a set of byte code in the application that is altered in a predetermined fashion, or a software mask applied to the licensed application to disable or corrupt all or part of the licensed application. As will be appreciated, a software mask effectively corrupts the software application (by adding, removing or altering byte code) at predefined or predetermined locations (or in a predefined or predetermined pattern). A software mask corrupts the bit sequence (by adding or removing byte code) at not one but several predefined locations.

In decision diamond 208, the secure download manager 128 determines whether a previously generated primary license key exists for the enterprise network of which the target device 108 is a part and/or for the target device 108. If not, the manager 128, in step 212, generates a primary license key by known techniques. For example, the key may be generated using standard Java Cryptology Extension (JCE). In one configuration, the key is unique for each download of the client and licensed application (hereinafter the licensed application is referred to as the "payload"). In this configuration, the installation is controlled and tracked. In this configuration, the decision diamond 208 is used as the user may provide the primary key to the licensing server 100. The primary key could have previously been provided to the user out-of-band, such as in a certificate, in materials accompanying the licensed application when purchased, and the like.

In step 216, which is performed after step 212 or in the event that a primary key exists, the manager 128 registers the primary license key 136, thereby registering the installation. This lets the licensing server 100 track the number of installation attempts by the user. The primary key is not sufficient by itself to control the installation because unauthorized copies of the client can be made.

In step 220, the manager 128 packages the payload, primary license key, and secure download client 150 and, in step 224, the package downloaded to the target device 108. If the target device differs from the machine to which the package is downloaded, the package is transferred to the target device. The download may be acquired on demand or pushed to the target device 108.

The client 150 has a number of preferred characteristics. First, the client should use Java technology so that the client is platform independent. It is thus preferred that the target device 108 support a Java Runtime Environment (JRE). Second, the client should support the required installation command set used on the target device 108. For example, if the user issues a "run" command from the operating system of the device 108 the "run" command will be issued/performed by the client 150.

Referring to FIG. 3, installation begins in step 300.

In step 304, the client 150 is invoked by the user.

In step 308, the client acquires unique transient state information 154 and generates the secondary license key 140. Transient state information 154 is generally information descriptive of the configuration (e.g., target and/or environment) of the target device that changes over time or is time dependent. Examples of transient state information include the start time of the installation or other system clock setting, the available volatile and/or nonvolatile memory 124 in the target device 108 at a selected point in time, the unavailable volatile and/or nonvolatile memory 124 in the target device 108 at a selected point in time, number of processes that are running at a selected point in time, available disk space, file system characteristics, e.g. number of text files, opened files, hidden files, etc., and process ids.

The secondary key 140 is generated using the primary key and state information as the inputs. The uniqueness of the primary key and, more importantly, the transient state information will cause the secondary key to be unique. Thus, the secondary key identifies uniquely the client with the installation attempt. The secondary key can be termed as a licensing code because the key is based on platform information. Any known key generation algorithm can be used by the client to determine the secondary key 140. Because the transient state information is maintained in volatile memory 124, after the client activates the licensed application, the application is executed, the application exits, and the client has stopped running, the transient state information is erased from memory 124. The transient state information is not persisted in any other storage medium on the target device side.

In decision diamond 312, the client attempts to connect to the licensing server 100. When the client is unable to contact the server 100, the client, in step 316, provides the secondary key to the user, and the user manually transmits the key to the licensing server 100. For example, the user can provide the key to a customer service representative or automated attendant in a telephone call or otherwise to the server in a Web-based communication, such as by the target device or by another device having Web connectivity. When connection with the licensing server is established, the secondary key, in step 320, is uploaded to the manager. As will be appreciated, the state information could be uploaded to the manager in lieu of the secondary license key. The manager could use the same key generating algorithm with the state information as input to generate independently the secondary license key.

After the secondary key is received by the manager, the manager, in step 324, registers the activation/installation attempt. The secondary key thus allows installation attempts to be tracked. It is important to note that the transient state information is preferably not provided to the licensing server.

In decision diamond 328, the manager validates the installation attempt to confirm that the installation does not violate the terms and conditions of the license. In one configuration if the secondary license key has not already been used and/or the number of valid installations has not been exceeded, an installation key is generated from the secondary key in step 336. As will be appreciated, any known key generation algorithm may be used to generate the installation key using the secondary key as input. If the secondary license key has been used previously, the user, in step 332, is informed that the installation request is denied. For most implementations, a process would be in place to allow the user to request another installation if the client is terminated prematurely during the installation process. These types of requests could be tracked and monitored. To deter fraudulent requests, additional installations could be denied (or applied only by a technician) after a defined number of reported client failures.

In step 336, after the installation attempt passes the manager generates an installation key using the primary and secondary keys. As noted, any known key generation algorithm may be used to generate the installation key using the primary and secondary keys as input.

In decision diamond 340, when the client is not connected to the manager the user, in step 344, receives the installation key, such as by an electronic message or telephone call, and inputs the installation key into the client.

When the client is connected to the manager or otherwise receives the installation key, the client, in step 348, validates the installation key. This is done using the transient state information in memory and the primary license key.

In decision diamond 352, the client determines whether or not the installation is valid. If not, installation is blocked in step 356 and the licensed application is not activated by removing the piracy guard. If the installation is valid, the installation proceeds in step 360 and the piracy guard is removed to activate the licensed application.

The activated payload is not saved to disk and consequently is not available for uncontrolled distribution.

After the installation is completed, the application has executed and exited, and the client has ceased running (or exited), the client, licensed application, primary and secondary license keys, and transient state information are erased from memory 124 of the target device 108.

The secondary and installation keys are unique for a client 150 and installation. The keys authorize the installation. If one of the keys is used with an unauthorized copy of a client 150, the installation is blocked. In contrast, the primary key may be reused across installations.

As noted, network connectivity is not required by the present invention. In practice, most installations will obtain the client 150 and transmit primary, secondary, and installation keys for convenience. The client can be distributed on persistent media such as a CDROM or DVD. The manager is shielded from network failures because installations can proceed without network connectivity.

As further noted, unexpected termination of the client will invalidate the installation. The user must get another installation key from the manager. Some implementations may elect to allow a fixed number of installations for each client to handle the situation. Other installations may require the user to go through a different channel to request another installation key; for example, the user may call a technician to obtain the new installation key. In either event, multiple installations can be accomplished and will be tracked by the manager.

A number of variations and modifications of the invention can be used. It would be possible to provide for some features of the invention without providing others.

For example in one alternative embodiment, a static identifier, such as a serial number, MAC address, and a system timestamp generated when a file is written to memory, is used to generate the secondary and/or installation keys in addition to the transient state information.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A software licensing method executed at a target computational device, comprising:

A processor sending a request to a server download manager to download a licensed application;

the processor receiving from the server download manager the licensed application and a primary license key;

in response to the request to download the licensed application, the processor obtaining a set of transient state information for the target computational device, wherein transient state information is information descriptive of a configuration of the target computational device that changes over time;

the processor generating a secondary license key with the transient state information and the primary license key;

the processor storing the secondary license key and the transient state information in the memory;

the processor sending the secondary license key to a server download manager;

the server download manager generating an installation key from the secondary license key and the primary license key and receiving, by the processor the installation key from the server download manager in response to the sending of the secondary license key;

the processor validating the installation key, with the stored transient state information; and in response to validating the installation key, the processor installing the licensed application.

2. The method of claim 1, wherein the transient state information is at least one available volatile memory, available nonvolatile memory, unavailable volatile memory, unavailable nonvolatile memory, a number of processes executing, available disk space, a file system characteristic or a clock setting at a specified event, an available memory in the target device at a selected time, an unavailable memory in the target device at a selected time, a number of processes running in the target device at a selected time, available disk space, file system characteristics, and process identifiers.

3. The method of claim 1, wherein the use of the licensed application is validated successfully and further comprising:

generating, by a processor and from at least one of the primary and secondary license keys, an installation key; and using, by the target computational device, the installation key to enable execution of the licensed application.

4. The method of claim 3, wherein the primary license key and secondary license key generated from the primary license key are each unique and wherein, for each request to execute the licensed application, a different set of transient state information is obtained and a different secondary license key generated, whereby a number of installation attempts can be tracked.

5. The method of claim 1, wherein, in the loading step, the application comprises a piracy guard, the piracy guard disabling the application, wherein the use of the licensed application is validated successfully and further comprising:
removing, by a processor, the piracy guard to activate the licensed application, wherein the piracy guard is at least one of (i) a byte code inserted into the licensed application code; (ii) a byte code removed from the licensed application code; and (iii) an altered byte code in the licensed application code.

6. The method of claim 3, wherein a secure download manager generates the installation key from both the primary and secondary license keys.

7. The method of claim 5, wherein the licensed application exits and further comprising:
storing, by the target computational device, the licensed application, transient state information, and license key in volatile memory,
as a result of the licensed application exiting, removing, by the target computational device, the transient state information and license key from volatile memory and not retaining, by the target computational device, the transient state information, and license key in nonvolatile memory of the target computational device, whereby, after each exit of the licensed application, the licensed application is deactivated and the receiving, obtaining, generating and using steps are repeated to reactivate the licensed application.

8. The method of claim 6, wherein the receiving step comprises:
receiving, by the secure download manager, a request from the target computational device to download the licensed application;
in response, installing, by the secure download manager, a privacy guard in the licensed application;
preventing, by the piracy guard, execution of the licensed application;
obtaining, by the secure download manager, the primary license key, wherein the primary license key is unique for each download of the licensed application;
registering, by the secure download manager, the primary license key and registering, by the secure download manager, the download;
packaging the primary license key, the licensed application, and a download client for downloading onto the target computational device;
transmitting the package to the target computational device;
directing, by the download client, execution of the licensed application; and
as a result, the licensed application not executing on the target computational device when the download client is not running.

9. The method of claim 8, wherein:
before the client exits, replacing the piracy guard in the licensed application.

10. A target computational device, comprising:
a processor;
a memory in communication with the processor, the memory comprising computer readable instructions when executed by the processor cause the processor to perform the steps of:
the processor sending a request to a server download manager to download a licensed application;
the processor receiving from the server download manager the licensed application and a primary license key;
in response to the request to download the licensed application, the processor obtaining a set of transient state information for the target computational device, wherein transient state information is information descriptive of a configuration, of the target computational device that changes over time;
the processor generating a secondary license key with the transient state information and the primary license key;
the processor storing the secondary license key and the transient state information in the memory;
the processor sending the secondary license key to a server download manager;
the server download manager generating an installation key from the secondary license key and the primary license key;
the processor receiving the installation key from the server download manager in response to the sending of the secondary license key;
and
the processor validating the installation key, with the stored transient state information; and
in response to validating the installation key, the processor installing the licensed application.

11. The system of claim 10, wherein the secure download manager and secure download client are performed by processors and wherein the transient state information is at least one of a clock setting at a specified event, an available memory in the target device at a selected time, an unavailable memory in the target device at a selected time, a number of processes running in the target device at a selected time, available disk space, file system characteristics, and process identifiers.

12. The system of claim 10, wherein the secure download client generates the secondary key using the transient state information and a primary key.

13. The system of claim 12, wherein the primary and secondary license keys are each unique, wherein the secure download client receives a request to execute the licensed application, and wherein, in response to receipt of the request to execute and for each request to execute the licensed application, the secure download client obtains a different set of transient state information, and generates a different secondary license key, and wherein the secure download manager tracks a number of installation attempts.

14. The system of claim 12, wherein a piracy guard disables the application, wherein the secondary license key is validated successfully, wherein, in response to the license key being validated successfully, the secure download client removes the piracy guard and wherein the piracy guard is at least one of (i) a byte code inserted into the licensed application code; (ii) a byte code removed from the licensed application code; and (iii) an altered byte code in the licensed application code.

15. The system of claim 10, wherein the licensed application exists and wherein, in response to the licensed application existing and after each exit of the licensed application, the at least one of the secure download manager and client obtains a different set of transient information and generates a different secondary license key.

16. The method of claim 2, wherein the transient state information is determined at a selected point in time, and the selected point in time is a time when the target computational device receives a request to execute the licensed application.

17. A computer program product comprising computer executable instructions stored onto a computer readable medium, when executed by a processor of a computer, causes the processor to execute a software licensing method at a target computational device, the software licensing method comprising:

sending a request to a server download manager to download a licensed application;

receiving from the server download manager the licensed application and a primary license key;

in response to the request to download the licensed application, obtaining a set of transient state information for the target computational device, wherein transient state information is information descriptive of a configuration of the target computational device that changes over time;

generating a secondary license key with the transient state information and the primary license key;

storing the secondary license key and the transient state information in the memory;

sending the secondary license key to a server download manager;

generating, by the server download manager, an installation key from the secondary license key and the primary license key;

receiving the installation key from the server download manager in response to the sending of the secondary license key;

validating the installation key, with the stored transient state information; and in response to validating the installation key, installing the licensed application.

18. The computer readable medium of claim 17, wherein the transient state information is at least one available volatile memory, available nonvolatile memory, unavailable volatile memory, unavailable nonvolatile memory, a number of processes executing, available disk space, a file system characteristic or of a clock setting at a specified event, an available memory in the target device at a selected time, an unavailable memory in the target device at a selected time, a number of processes running in the target device at a selected time, available disk space, file system characteristics, and process identifiers.

19. The computer readable medium of claim 17, wherein the installation key is generated from the primary license key and the secondary license key.

20. The computer readable medium of claim 19, wherein the primary license key and secondary license key which is generated from the primary license key, are each unique and wherein, for each request to execute the licensed application, a different set of transient state information is obtained and a different secondary license key generated, whereby a number of installation attempts can be tracked.

21. The computer readable medium of claim 17, wherein the licensed application comprises a piracy guard, the piracy guard disabling the application, and further comprising:

in response to validating the installation key, the processor removing the piracy guard to activate the licensed application, wherein the piracy guard is at least one of (i) a byte code inserted into the licensed application code; (ii) a byte code removed from the licensed application code; and (iii) an altered byte code in the licensed application code.

* * * * *